United States Patent
Brown

(10) Patent No.: US 12,129,160 B2
(45) Date of Patent: Oct. 29, 2024

(54) METHOD FOR DISPENSING CUSTOMIZED HEMP EXTRACT TINCTURES

(71) Applicant: Stephen Michael Brown, Cornelius, NC (US)

(72) Inventor: Stephen Michael Brown, Cornelius, NC (US)

( * ) Notice: Subject to any disclaimer, the term of this patent is extended or adjusted under 35 U.S.C. 154(b) by 254 days.

(21) Appl. No.: 17/649,693

(22) Filed: Feb. 2, 2022

(65) Prior Publication Data

US 2023/0242391 A1    Aug. 3, 2023

(51) Int. Cl.
*B67C 3/02* (2006.01)
*B67C 3/00* (2006.01)
*B67C 7/00* (2006.01)

(52) U.S. Cl.
CPC .............. *B67C 3/023* (2013.01); *B67C 3/007* (2013.01); *B67C 7/00* (2013.01)

(58) Field of Classification Search
CPC ........... B67C 3/007; B67C 3/023; B67C 7/00; B67C 7/0073; B67C 7/0046; B67C 7/004; B67C 3/22
USPC .................. 53/495, 445, 494, 505, 55, 467
See application file for complete search history.

(56) References Cited

U.S. PATENT DOCUMENTS

| | | | | |
|---|---|---|---|---|
| 4,927,062 A | * | 5/1990 | Walsh | B65D 47/18 422/930 |
| 5,002,206 A | * | 3/1991 | Allegretti | A61F 9/0008 239/327 |
| 2002/0079338 A1 | * | 6/2002 | Pardo | B65D 47/18 222/422 |
| 2008/0319566 A1 | * | 12/2008 | McGuinness, Jr. | B65B 67/08 53/461 |
| 2009/0287547 A1 | * | 11/2009 | Scanlon | G06Q 30/02 705/1.1 |
| 2014/0331617 A1 | * | 11/2014 | Napravnik | G01N 21/8806 53/493 |
| 2015/0291300 A1 | * | 10/2015 | Brandt Sanz | B65B 41/16 53/64 |
| 2020/0054702 A1 | * | 2/2020 | Heller | A61K 45/06 |
| 2020/0299012 A1 | * | 9/2020 | Sebastian | B65D 47/12 |
| 2020/0377269 A1 | * | 12/2020 | Kirsh | B05B 11/047 |
| 2020/0393281 A1 | * | 12/2020 | Haimm | A61J 1/2096 |

* cited by examiner

Primary Examiner — Jacob A Smith
(74) Attorney, Agent, or Firm — Dunlap Bennett & Ludwig, PLLC; Anna L. Kinney

(57) ABSTRACT

A method of dispensing customized hemp extract tinctures includes dispensing at least one of multiple cannabinoid isolate solutions and an inactive carrier oil into a tincture container by way of calibrated dispensers and sealing the tincture container.

3 Claims, 2 Drawing Sheets

METHOD FOR DISPENSING CUSTOMIZED HEMP EXTRACT TINCTURES

BACKGROUND OF THE INVENTION

The present invention relates to hemp oil tinctures and, more particularly, to a method for dispensing customized hemp extract tinctures Many consumers are unable to find a hemp oil tincture that fits their exact needs (regarding strength, cannabinoid ratios, terpene content, etc.) because everyone is looking for something different. The standard tinctures on the market only address people's needs and desires in a very broad way and do not home in on people's particular desires/needs. They lack customization. Likewise, store owners must carry dozens of variations/flavors/strengths of tinctures to try to meet people's needs which leads to massive overhead costs and often still does not meet the consumer's needs.

The best a consumer can do is to shop around and try to find something close to what they are looking for. The process is time consuming and money wasting.

As can be seen, there is a need for a customized hemp oil tinctures.

SUMMARY OF THE INVENTION

The present invention provides a tincture bar that delivers a truly customized tincture, thereby offering thousands of options of cannabinoid ratios for the retail tincture market. The tincture bar is designed to easily and enjoyably deliver a customized tincture based on a questionnaire that the customer takes. This addresses the customer's needs/desires and cuts down on unnecessary inventory for store owners. The outcome is repeatable and may be optimized depending on the demographic served. A pricing spreadsheet may be provided to adjust price according to the strength.

In one aspect of the present invention, a method of dispensing customized hemp extract tinctures, comprising: providing a plurality of cannabinoid isolate solutions; dispensing at least one of the plurality of cannabinoid isolate solutions into a tincture container by way of calibrated dispensers to produce a tincture composition; dispensing an amount of an inactive carrier oil into the tincture container to a total volume; and sealing the tincture container.

In another aspect of the present invention, a customized tincture dispensing system is provided, comprising: a plurality of bottles each having a calibrated dispenser and a tincture bottle with a tamper-evident dropper top.

These and other features, aspects and advantages of the present invention will become better understood with reference to the following drawings, description, and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a system for dispensing custom hemp extract cannabinoid tinctures and a method therefor.

The customized tincture dispensing system comprises glass media bottles, calibrated lab dispensers, various cannabinoid isolate solutions, carrier oils, a tincture bottle (e.g., 30 ml) or any other suitable tincture container, and a bottle top.

In some embodiments, a customer questionnaire may be used in determining the calibrations. The questionnaire may be provided as a computer-operated program, used with a printer to print a tincture label that lists the solution ratio(s). The questionnaire results establish an if-then scenario. The numbers that result from the questions determine how to calibrate the dispensers.

In some embodiments, the system may provide automated dispensing, e.g., by electric pumps and bottle top applicators to increase speed and remove human error. Alternatively, the solutions may be dispensed manually.

The process steps may be performed in any suitable order.

Various pre-prepared cannabinoid isolate solutions may be contained in a series of glass media bottles. A scientifically calibrated dispenser affixed atop each bottle may dispense a predetermined amount of solution into a 30 ml tincture bottle to produce a tincture composition. The retailer may complete the 30 ml content with an inactive carrier oil of the customer's choice, such as medium chain triglyceride (MCT) oil or Hemp Seed oil, to obtain the total volume. The store worker may place a tamper-evident glass dropper top on the tincture bottle and seal it. The store worker may record the amount of each ingredient dispensed on a custom label before or after filling the bottle and may apply the label onto the bottle.

In an embodiment, four 500 ml-1000 ml and two 100 ml-2000 ml media bottles may be provided to hold solutions. The bottle size is not particularly limited. The retailer may prepare solutions of cannabinoid isolates and MCT to be held in the 1000 ml bottles. The retailer may use the 2000 ml bottles to hold extra carrier oil. Scientific dispensers may be screwed onto each bottle.

In some embodiments, the isolate solutions and the carrier oil may be magnetically stirred. Placing the bottles with the *cannabis* solutions on magnetic stirrers, the retailer may drop a 1-inch magnet stirring pellet into each solution to homogenize the contents.

Figure 1:
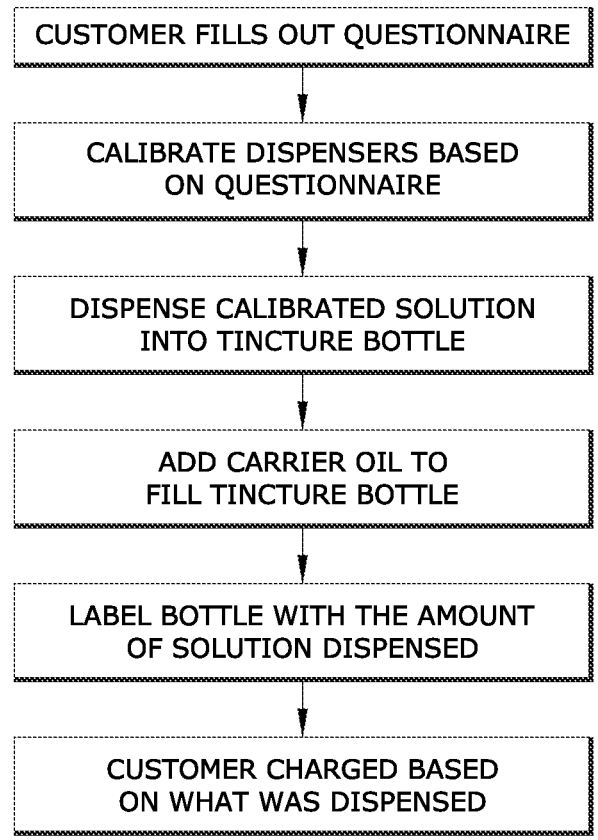
FIG. 1 is a flow chart of a method according to an embodiment of the present invention.
Figure 2:
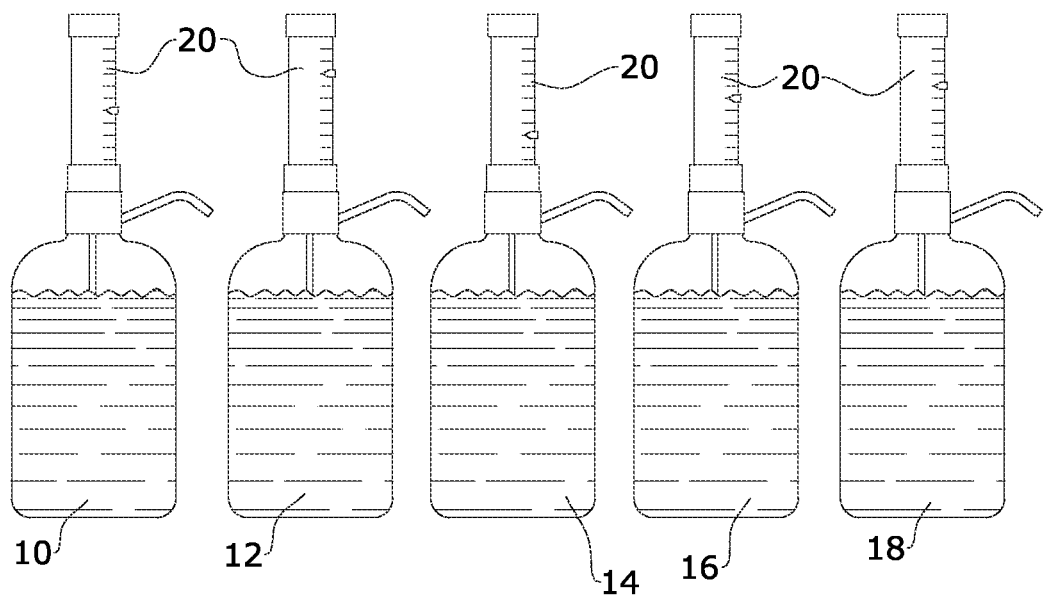
FIG. 2 is a schematic view of a system therefor.
Figure 3:
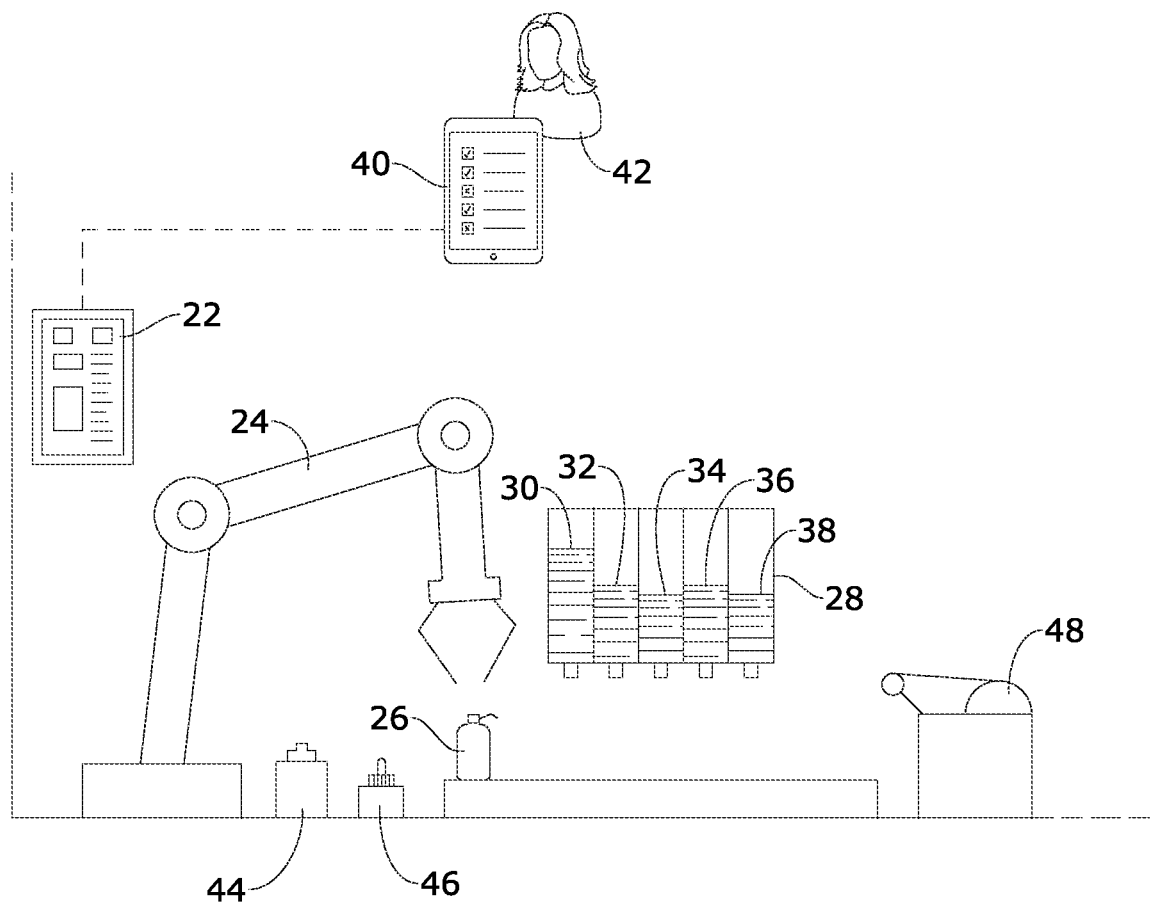
FIG. 3 is a schematic view of a system according to an embodiment of the present invention.

Referring to FIGS. 1 through 3, FIG. 1 provides a flowchart of a method of customizing hemp extract tinctures including giving the customer a questionnaire to determine the ratio of cannabinoids (CBD, CBG, CBN, etc.) and collecting results. Using the results, the retailer may calibrate dispensers on various bottles containing selected solutions. The retailer may dispense the calibrated amount of each solution into a tincture bottle and may add carrier oil to fill the remaining bottle volume to produce a customized hemp extract tincture. The retailer may screw a tamper-evident dropper top onto the tincture bottle and make sure it is sealed. After preparing a tincture label with the amount of each solution dispensed, the retailer may apply the label to the tincture bottle. The customer may be charged according to what was dispensed.

FIG. 2 illustrates a system according to an embodiment of the present invention, comprising a plurality of International Organization for Standardization (ISO) bottles with calibrated dispensers 20 on each bottle, the bottles containing cannabidiol (CBD) 10, CBD full spec 12, cannabinol (CBN) 14, cannabigerol (CBG) 16, and carrier oil 18.

FIG. 3 illustrates a system according to another embodiment of the present invention, in which the method of hemp extract tincture customization may be automated. Once the customer 42 completes a quiz, for example on a tablet computer 40, a processor having a wireless control panel 22 analyzes the response and operates a robotic arm 24 to select a tincture bottle 26 from a tincture bottle dispenser 44, fill the tincture bottle 26 with calculated proportions of carrier oil 30, CBD with TCH 32, CBD isolate 34, CBG isolate 36, CBN isolate 38 from an automated dispenser 28 electronically communicating with the processor 22, seal the tincture bottle 26 with a top obtained from a dropper top dispenser 46. The processor 22 further operates a label printer and applicator 48 that applies a label indicating the contents to the tincture bottle 26.

It should be understood, of course, that the foregoing relates to exemplary embodiments of the invention and that modifications may be made without departing from the spirit and scope of the invention as set forth in the following claims.

What is claimed is:

1. A customized tincture dispensing system, comprising:
   a plurality of bottles each having a calibrated dispenser and
   a tincture bottle with a tamper-evident dropper top;
   a computer processor;
   an input device operative to collect customer responses to a quiz, the input device being in electronic communication with the computer processor;
   an automated tincture dispenser having a plurality of tincture compartments, the automated tincture dispenser being in electronic communication with the computer processor;
   a robotic arm configured to select and transport a tincture bottle, the robotic arm being in electronic communication with the computer processor; and
   a label printer having a label applicator operative to apply a printed label to the tincture bottle, the label printer being in electronic communication with the computer processor.

2. The customized tincture dispensing system of claim 1, wherein the plurality of bottles comprises a bottle containing each of cannabidiol, cannabigerol, cannabinol, and a carrier oil.

3. The customized tincture dispensing system of claim 1, further comprising a magnetic stirrer supporting each of the plurality of bottles and a magnet stirring pellet contained within each of the plurality of bottles.

* * * * *